S. Sawyer,

Working Rattan.

N° 8,178.   Patented July 24, 1851.

UNITED STATES PATENT OFFICE.

SYLVANUS SAWYER, OF TEMPLETON, MASSACHUSETTS.

MACHINERY FOR CUTTING RATAN, &c.

Specification of Letters Patent No. 8,178, dated June 24, 1851.

*To all whom it may concern:*

Be it known that I, SYLVANUS SAWYER, of Templeton, in the county of Worcester and State of Massachusetts, have invented a new and useful Machine for Cutting Canes or Ratans Into Strands for Chair-Seating and other Like Purposes; and I do hereby declare that the following is a full, clear, and exact description of the same, taken in connection with the accompanying drawings, making part of this specification, in which—

Figure 3:
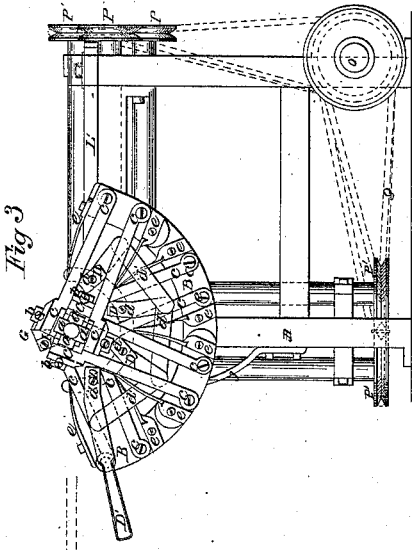
Figure 1:
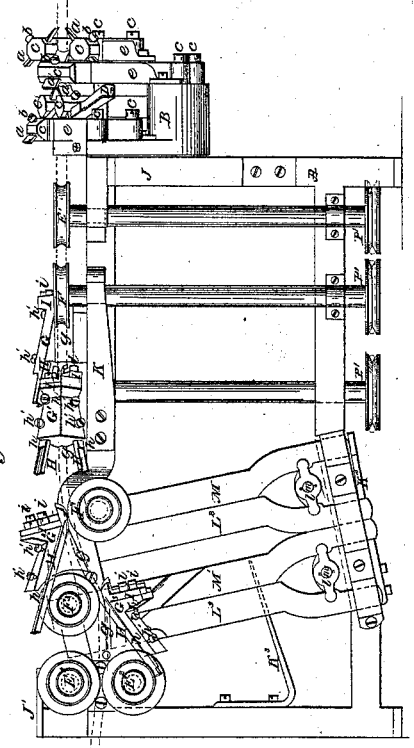
Figure 4:
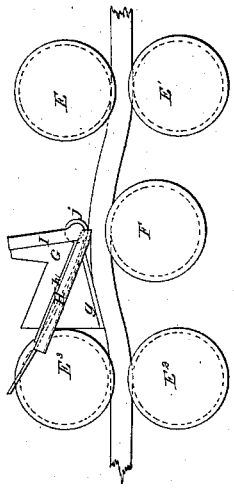
Figure 5:
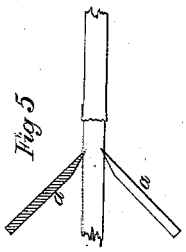
Figure 2:
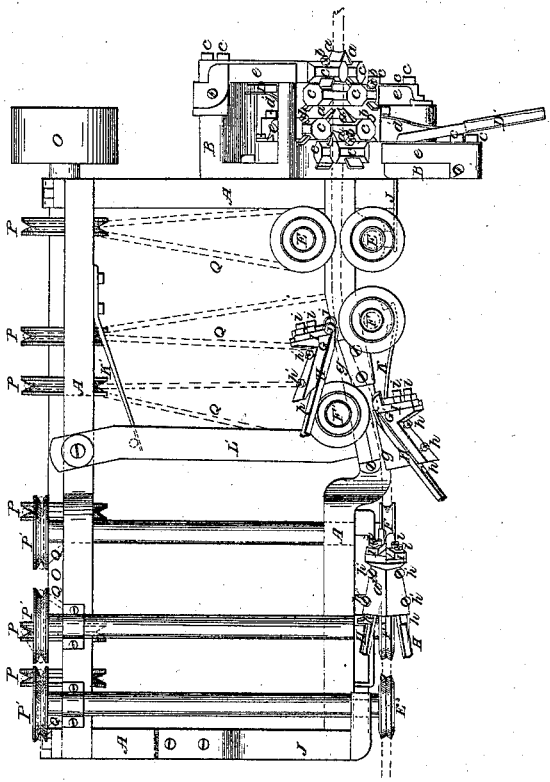

Figure 1, is a side elevation; Fig. 2, a plan; Fig. 3, an end elevation, and Figs. 4 and 5 are details drawn to a larger scale of certain parts of the machine, to show more clearly the principles of their operation.

The first part of my invention relates to an apparatus for removing the joints or any other excrescence from the surface of the ratan preparatory to cutting the same into strands; and consists in subjecting the stick of ratan, while drawn longitudinally, to the action of a series of cutters or scrapers of a certain description, so formed that they will cut off the protuberances of the cane without cutting into it; and so placed as to act upon all parts of its circumference.

The second part of my invention relates to an improved method of cutting or splitting the cane or ratan into strands (so called) of the proper form for chair seating or any other required purpose; and may in some respects be considered as an improvement upon the methods for which Letters Patent were granted to me November 13th 1849; and consists in cutting the several strands from the surface of the cane by cutters of the proper form which are gaged so as to cut to a certain depth and are applied so as to act upon the cane while it is bent out of a straight line, in such a manner as that the edge of the cutter shall act upon the external part of the curvature, by which certain new and useful results are obtained and certain difficulties avoided as will be hereafter more fully described.

The machine is described as follows, the letters referring to the same parts in all the figures.

A is the frame of the machine upon which the several parts thereof are arranged.

B is the stock of that part of the machine called the "scraper." It is made of cast iron and of such form as to receive the several parts which are affixed thereto as shown in the drawing.

C, C, &c., are levers which carry the several cutters or scrapers $a$, $a$, &c., which act upon the stick of ratan as it is drawn longitudinally between them. They are attached to the stock B, by screws $c$ upon which they vibrate as a center. The cutters $a$ are set in mortises near the outer ends of the levers C and are secured therein by the set screws $b$. They are set at an angle of about forty-five degrees with the central line of the stick of ratan upon which they act. Their cutting edges are hollowed to conform to the circumference of the stick, and they are arranged so as to act upon all sides of it as shown in the drawing. The bevel of their cutting edges is also made at an angle of forty-five degrees with the face of the cutter, so that it is parallel with, and conforms to the surface of the stick longitudinally as is shown more clearly in Fig. 5. By this means the cutters are prevented from cutting into the wood, and can only remove any substance that may project beyond the general surface. They are kept in contact with the stick by the action of the springs $e$ which press upon the levers C severally with considerable force. After the cutters are once fitted they require no further sharpening, as the surfaces which bear upon the stick are worn by the silicious matter of the enamel of the ratan, so as to be always sharp and of course so as to conform to its surface. Between each pair of levers C, are placed the cams D, D, &c., for the purpose of forcing them asunder when required. They turn upon the screws $d$, as a center which are fixed in the stock B. They are made of the form shown and are connected with each other and with the handle D' by the links $d'$ so that by moving the handle in the direction of the arrow the cutters $a$ are all moved asunder simultaneously in a perfectly obvious manner.

E, $E^1$, $E^2$, $E^3$, are feeding rollers by which the stick of ratan is carried forward through the machine. The first pair seizes it after it has passed through the "scraper" and the last pair, after it has passed all the cutting apparatus as is shown in the drawing. Other additional feeding rollers may be used if the nature of the work shall require it. The rollers E, $E^2$ are stationary, but the rollers $E^1$ $E^3$ are movable so as to accomodate the varying diameter of the stick, and they are forced against the same by the springs J J¹.

F, F¹, F², F³, are rollers called bed rollers which serve to hold the ratan in the proper position while being cut and also to assist in propelling it forward. They each work in separate combinations as will be hereafter described.

G, G¹, G², G³, are the several cutter stocks or sections to which the cutters H and gages I are attached, which cut the several strands from the stick. The cutters H are made of a gougelike form with the edges of such shape as will give a proper shape to the strands. They are each placed in a groove of the proper form in the stock G and the open side of each is covered with a plate or cap $h$, which leaves a tubular aperture through the entire length, through which the strand is discharged as it is cut from the stick. They are held in place by the set screws $h'$, or they may be affixed to the stock by any other of the well known modes by which such adjustments are made. I, I, &c., are the gages or guides which determine the distance which the cutters H are permitted to cut into the wood and consequently the thickness of the strand. They may be made with rollers $j$ to bear upon the stick as shown on the first stock G, or they may be made solid of the form shown on the stocks G¹, G², G³. These bearing surfaces are so formed and placed in such relation to the cutters, as that the point of the same nearest the cutter shall be a very little back of the cutting edge so that the strand will be slightly compressed in cutting it. They are also fastened to the stocks G, by screws $i$ or by any other analogous means. The edges of the cutters H are set in such a manner as that the bevel of the cutting edge shall be nearly tangential to a circle concentric with the bed rollers, so as to present it in a proper manner to the curved stick of ratan upon which it acts; and produce but a small deflection of the strand as it is removed from the surface of the same as will be more fully explained.

$g$ is a part of the stock G which projects below or back of the cutter and forms a guide for the stick after it has passed the cutting edge and serves in connection with the bed roller F to bend the stick so as to present the external curvature of the same to the action of the cutter as is shown more clearly in Fig. 4. The face of the guide $g$ is made of such form as to fit the cavity left by removing the strand, which prevents the stick from rolling and guides it properly to the succeeding cutters so that they shall act at the proper point in the circumference and not run into the space from which the strand has been removed.

Each of the four stocks G is made in this machine to carry two cutters and they are set in such relation to each other as that the cutters will act upon all sides of the stick; and also that the stick in passing from one to the other, and over their respective bed rollers shall be bent so as to present the proper curvature to the cutters in each section. There may be one or more cutters in each section or stock as may be required; but when two or more are used their cutting edges should be placed, one a little before the other as shown in the drawing, so that their actions shall not interfere. A sufficient number of cutters may be used to remove the entire surface, varying the number of cutters to the size of the ratans and also to the size of the strand; or a single section only, with one or more cutters may be used to remove only a part of the surface as shown in Fig. 4. By the single section, the whole surface may also be removed by repeating the operation and presenting successively the different sides of the ratan to its action in a perfectly obvious manner. The first stock G is fastened firmly to the frame A and its bed roller F is made so as to move to and from it to accommodate the varying size of the ratans. It is pressed toward the cutters H by the spring K in a perfectly obvious manner. This arrangement of the cutter stock and bed roller may be modified in various ways, as is exemplified in the three other sections. In the second section the bed roller F¹ is stationary and the cutter stock G is attached to a sliding bar L¹ which is properly guided so as to move to and from the bed roller, and is pressed toward it by the spring K¹. And in the third and fourth sections both the stocks and the bed rollers are made to move and are attached to the sliding bars L² L³ and M, M¹ respectively, which are made to move simultaneously in opposite directions through the intervention of the small balance levers $l$, $l$, which turn upon centers fixed in the frame A at $m$. They are forced together by the springs K² K³ respectively which act upon the sliding bars L², L³, in a perfectly obvious manner. This last mode has the advantage of preserving the same amount of curvature in the stick though the size thereof may vary; while in the two first examples the curvature varies in some degree with the varying diameter of the stick. The bed roller may also be dispensed with and a rest with a curved surface may be used instead and made stationary or movable as the case may require.

The feeding rollers E, E¹, E², E³, and bed rollers F, F¹, F², F³, receive their motion from the main driving shaft O by means of the pulleys P, P¹, and belts Q or by any other method of gearing which will impart the requisite motion to them respectively.

The operation of the machine is as follows. The machine being in motion the operator raises the handle D' and opens or draws back all the cutters of the "scraper" so as to freely admit the stick of ratan which is inserted until it reaches and is seized by the first pair of feeding rollers E E'. The handle D' is then released and the cutters $a$ are forced forward by the springs $e$ so as to act upon the surface of the stick; and as it is drawn forward by the action of the feeding rollers they remove from it any parts which may project above its general surface as has been already described. The stick after leaving the first pair of feeding rollers passes between the bed roller F and the cutters H of the first section G, by which two strands are removed; and along the guide $g$ by which the necessary deflection of the stick is produced and it is guided to the next bed roll F and section G which are placed in such a relative position as to act upon the opposite side of the same and to remove two more strands, and so on to the other sections, each of which is placed in such relation to the preceding as that the stick in passing from one to the other shall be properly bent; and also that each cutter shall act upon a different part of the circumference. After the stick has passed the last section $G^3$ it passes between the last feeding rollers $E^2$, $E^3$, which assist in drawing it forward, and the remaining pith or heart is discharged from the machine. The bending of the stick at the point of cutting is of great importance in the practical working of the machine. When a small portion is split off from a large piece in the manner that the strand is removed from the stick of ratan, there is a strong tendency of the strand to "run off" as it is called; and also in cutting off a small portion in the same manner in the form of a shaving, it leaves a smooth surface upon the stick but a rough or broken one on the shaving on account of its being unduly bent in the process of removing it. But in cutting ratan into strands it is of more importance that the inner surface of the strand shall be smooth, rather than the stick. Both the difficulties mentioned are obviated by bending the stick in the manner described, for thereby the strand is but little bent in removing it, and in flaying it off from the stick it runs in until it is stopped by the gage.

The several parts of this machine may be variously modified and still retain the general principles and character thereof. As for instance that part of the machine called the "scraper" may be detached from the machine and used separately for the purpose of preparing ratans to split by hand or otherwise; and also the several cutters or scrapers may be attached to stocks moving in guides, instead of the levers C as herein described; as the mere mechanical devices by which the scrapers are applied to the ratan are not material; the essence of this part of my invention being the method of removing excrescences from the surface of the ratan by a series of cutters or scrapers substantially as described, the edges of which are hollowed to conform to the circumference of the ratan, and the bevel of whose cutting edges conforms longitudinally to the surface of the same; so that while it removes any matters which may project above the general surface, it cannot cut into the same; and also that by the same means the scrapers may be kept sharp and in order by the wearing of the same by this stick. And so also instead of using the scrapers in pairs acting opposite to each other; they may be used singly with a rest upon the opposite side of the stick instead; or a less number of scrapers may be used acting upon only a part of the circumference at a time; these being mere varieties in form without at all changing the principle. And so of the second part of my invention; various other equivalent mechanical devices may be used for producing the same result instead of those herein described, without departing from the principle of this part of my invention, which consists in cutting the strand from the stick with a cutter gaged to cut to a certain depth, the stick being bent so as to present the external curvature thereof to the cutting edge; by which the several advantages hereinbefore described are attained, and the work is done more perfectly than by any mode heretofore known.

What I claim as my invention, and desire to secure by Letters Patent is:

1. I claim the combination of the cutters $a$ as described with the levers C and springs $e$ and same D or their equivalents, and also handles D' and links $d'$ for the purpose of applying said cutters or scrapers so as to act upon the stick of ratan in the manner herein described and by which they may all be operated simultaneously substantially in the manner herein described.

2. In the process of cutting cane or ratan into strands as described I claim bending the stick at the point at which the cutter is removing the strand from the surface.

3. I claim the combination of the elements which compose each simple section of the cutting apparatus that is to say, of the cutter H and gage I with the stock G and guide $g$, and bed-roller F or their equivalents substantially as described for the purpose of bending the stick and removing the strand therefrom, whether said section is used alone, or is combined with others as described.

4. I claim the combination of that part of the machine called the "scraper" with the feeding rollers or their equivalents, and the several sections of the cutting apparatus; said sections being so arranged in relation to each other as that the stick in passing from the one to the other shall be properly bent; and also that the several cutters shall act upon different points of its circumference; the whole being arranged and operating substantially in the manner herein described and set forth.

Athol June 3d 1851.

SYLVANUS SAWYER.

In presence of—
 CHAS. FIELD,
 C. H. BLISS.